United States Patent [19]
Richter

[11] Patent Number: 4,865,928
[45] Date of Patent: Sep. 12, 1989

[54] ELECTRIC BATTERY

[75] Inventor: Gerolf Richter, Hagen, Fed. Rep. of Germany

[73] Assignee: Varta Batterie Aktiengesellschaft, Hanover, Fed. Rep. of Germany

[21] Appl. No.: 248,671

[22] Filed: Oct. 5, 1988

[30] Foreign Application Priority Data

Oct. 6, 1987 [DE] Fed. Rep. of Germany ..... 37337343

[51] Int. Cl.$^4$ ............................................. H01M 10/50
[52] U.S. Cl. .................... 429/120; 429/210; 429/233; 429/241
[58] Field of Search ................. 429/120, 62, 241, 233, 429/210

[56] References Cited

U.S. PATENT DOCUMENTS 2,855,453 10/1958 Eidensohn ............................ 429/120
4,292,381 9/1981 Klein ..................................... 429/120

FOREIGN PATENT DOCUMENTS 2657183 6/1978 Fed. Rep. of Germany ...... 429/120
0384163 8/1973 U.S.S.R. .............................. 429/120

Primary Examiner—Donald L. Walton
Attorney, Agent, or Firm—Weiser & Stapler

[57] ABSTRACT

For the effective removal of Joule heat from the interior of a high-performance lead battery, especially those with a fixed electrolyte, at least one of the negative grid plates which participate in the development of the electrodes are provided with a U-shaped tube which surrounds and is attached to the grid, in place of the usual grid frame, and through which a coolant circulates. Especially advantageous due to its capacity to conduct heat is a combination of a lead-coated, copper mesh grid and a copper tube, with a residual strip of unexpanded copper sheeting attached to the grid mesh along the remaining upper section of the frame, and developing the conducting lug.

16 Claims, 1 Drawing Sheet

ELECTRIC BATTERY

BACKGROUND OF THE INVENTION

This invention generally pertains to an electric battery, and in particular, to a lead battery of the type having a cell box which contains an electrolyte and an element formed from positive and negative electrodes with intervening separators, and cooling tubes which can be connected to a cooling device.

The charging of a lead battery is generally associated with a considerable increase in temperature. Such heating results not only from the charging reaction itself, which is exothermic, but predominantly from the Joule heating effect which results from the expended charging current, which is only partially utilized for electrochemical conversion. With gas-tight lead batteries there is also the consideration that the oxygen consumption which occurs during the terminal phase of charging, with overcharging at the negative electrodes, is likewise an exothermic process.

Thus, damaging temperatures are attained quite readily, particularly in connection with high performance batteries (i.e., batteries which not only discharge at high currents but which through a quick charge can be brought from a completely depleted state to a full charge within a few hours). Particularly affected are those cells which do not have a freely movable liquid electrolyte (i.e., fixed electrolytes), which through convection can contribute to a certain dissipation of heat from the elements of the cell.

In a conventional battery with an open cell architecture (e.g., large cells for vehicles), it is generally sufficient to circulate water around the cell connectors to achieve effective cooling. Alternatively, as suggested in DE-AS 24 14 758, coolant lines of corrosion-resistant plastic can be arranged within the cell so that they dip into the electrolyte for cooling purposes DE-OS No. 26 57 183 discloses a device having two chambers which communicate through connecting tubes arranged essentially within the gas compartment of the cell to permit a tempering of the liquid electrolyte portion as well as the vaporous and gaseous aggregates contained within the cell, and in which the circulation of coolant through the connecting tubes is adjusted using an appropriate valve.

However, such measures have not proven to be entirely satisfactory, particularly in connection with higher performance cells or cells with fixed electrolytes.

SUMMARY OF THE INVENTION

It is therefore the principal object of this invention to provide higher performance batteries of the type previously mentioned which can undergo continuous cycling without exhibiting impermissibly high operating temperatures.

It is also an object of this invention to provide such batteries which are further protected from the water losses which would result from such impermissibly high operating temperatures.

These and other objects are achieved according to the present invention by providing an improved cooling system for an electric battery of the type which generally includes a cell box for containing an electrolyte and an element formed from positive and negative electrodes with intervening separators, and cooling tubes which can be connected to a cooling device. To this end, at least portions of a plate electrode are provided with a frame, preferably assembled around the lower and side edges of the plate electrode and formed as a tube made of a heat-conducting material, for connection to a coolant line which communicates with the cooling device.

The present invention can be used in connection with any of a variety of electric batteries, but is particularly useful in connection with all types of high performance industrial batteries equipped with negative grid plates and which operate with little or no maintenance. Such operation is made possible by the very closely metered quantity of electrolyte (generally a sulfuric acid electrolyte) which is drawn up into the pores of the active material and the separators, or which is fixed between the electrodes in a gel formation, as well as by the presence of a negative surplus capacity (i.e., the so-called charge reserve).

For further detail regarding the electric battery of the present invention, reference is made to the description which is provided below, taken in conjunction with the following illustrations.

BRIEF DESCRIPTION OF THE DRAWINGS

In these drawings, like reference numerals denote similar structures.

DETAILED DESCRIPTION OF THE PREFERRED EMBODIMENT

Figure 1:
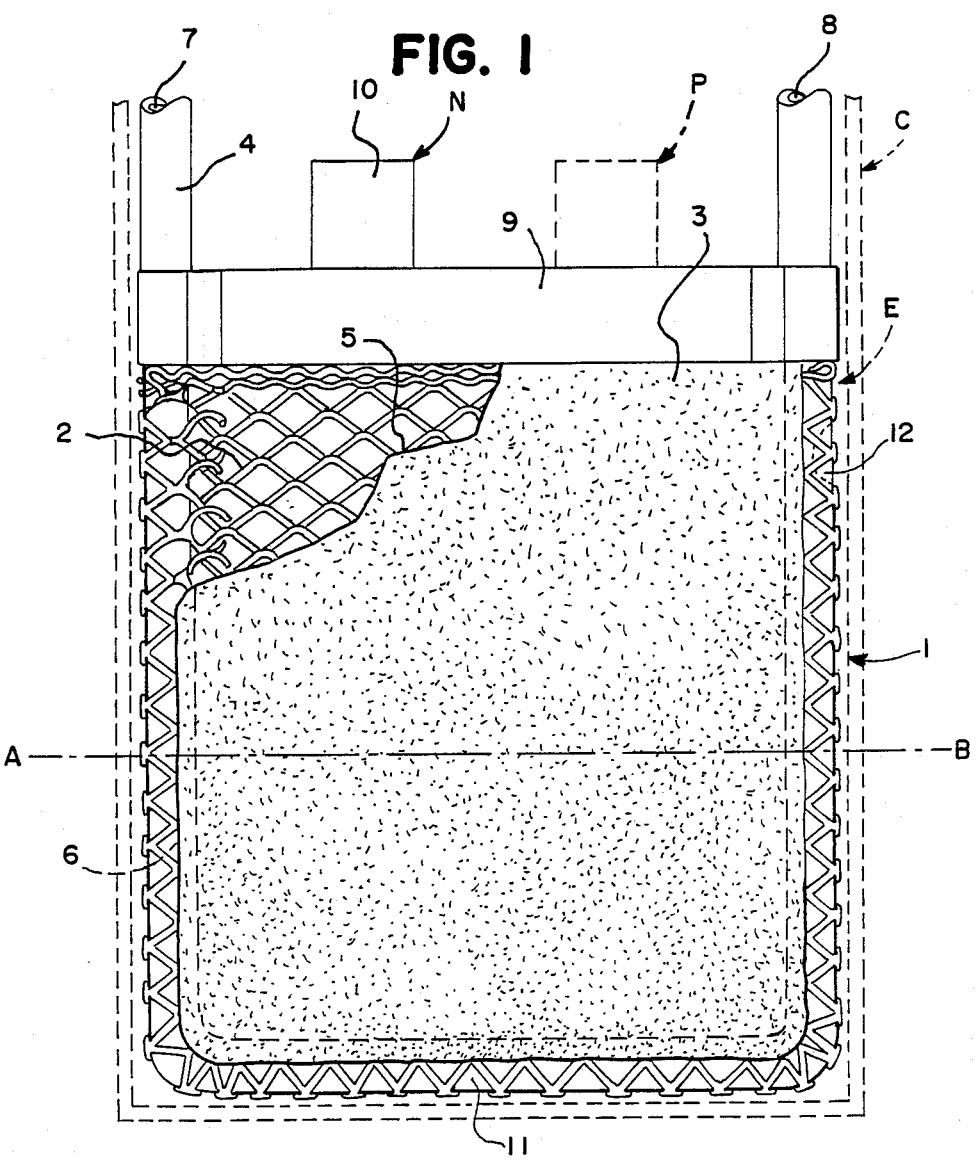
FIG. 1 shows a negative grid plate according to the present invention, positioned within a cell box.
Figure 2:
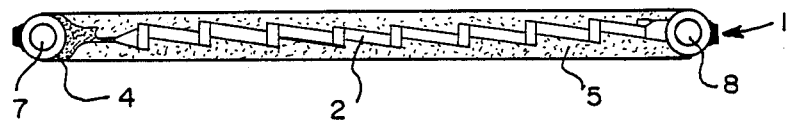
FIG. 2 shows a cross-section of the grid plate of FIG. 1, taken along the line A—B.

FIG. 1 shows a cell box (C) which in conventional fashion contains an electrolyte (E) and an element formed from positive (P) and negative (N) electrodes with intervening separators. In accordance with the present invention, the cooling tubes which were conventionally provided in such cells, and which were in turn connected to an appropriate cooling device, have been replaced with a novel cooling tube arrangement which will now be more fully described as applied to a negative electrode 1 of the battery, which is preferred.

The negative electrode 1 conventionally includes a grid mesh support 2 for receiving an active mass 3. However, in accordance with the present invention, a U-shaped tube 4, through which a coolant can circulate and which is formed of a good heat-conducting material, surrounds and supports the grid 2 of the negative electrode 1, replacing the conventional grid frame of the electrode 1 on corresponding sides of the grid 2. In the illustrated embodiment, this is accomplished by applying the grid mesh support 2 to the three sides of the U-shaped tube 4, for example, by crimping (and flattening) the respective edges of the grid 2 to the U-shaped tube 4. An appropriate paste 5 (active mass) is then applied to the grid 2, filling the space between the inner contours of the U-shaped tube 4 (as shown by the hatched lines 6 in FIG. 1). The open ends 7, 8 of the U-shaped tube 4 then serve as the inlet or outlet for the coolant which flows through the U-shaped tube 4.

A residual strip 9 of the material forming the grid mesh support 2, and which is preferably formed as an integral component of an expanded metal grid mesh, is also fastened to the cooling tube 4. This is again accomplished by crimping, or by beading along end sections of the strip 9, developing a yoke between the two tube posts 7, 8 and at the same time sealing (completing) the upper section of the resulting frame. The strip 9 further advantageously provides a current conducting lug 10 for the resulting electrode structure.

Thus, the relatively large grid surface of the negative electrode is connected to a U-shaped tube for efficient conduction, so that generated heat is transferred as quickly as possible from the interior of the plate group to the respective cooling tube.

The thickness of the cooling tube 4 in a direction generally normal to the plate should be made to conform as much as possible (through pasting or pressing) to the thickness of the active mass coating 5 which is applied to the grid 2. This operates to ensure the stacking capacity of the negative plate together with its corresponding positive plates and separators. In this regard, it is to be noted that tube cross-sections other than circular ones (e.g., rectangular or square cross-sections) are also useful in the context of the present invention.

It is particularly advantageous in accordance with the present invention for the cooling tube 4 which surrounds the negative electrode 1 to be formed of copper tubing, and for the grid 2 to be formed of copper, preferably as an expanded metal sheet. This is so because of the good heat conducting properties of copper, as well as its workability, which allows the tube 4 to be expeditiously held in place by crimping the edges of the flattened grid mesh 2 along the sides of the U-shaped tube 4, which can be readily accomplished as a fully automated step in the finishing process. The grid mesh 2 is thus in essence stretched between the two extending posts 7, 8 and the horizontal midsection 11 of the U-shaped cooling tube 4.

Because copper grids are subject to copper removal from the negative electrodes during the curing process, and could reverse polarization during formation, they are usually coated with lead. This protective step is therefore preferred in connection with the arrangement of the present invention (shown at 12 in FIG. 1). This lead coating has an especially advantageous effect in connection with the electrode structure of the present invention because in addition to adhesion of the active mass 5 to the grid 2, mechanical and electrical contact between the grid 2 and the cooling tube 4 is considerably enhanced.

It will be understood that various changes in the details, materials and arrangement of parts which have been herein described and illustrated in order to explain the nature of this invention may be made by those skilled in the art within the principle and scope of the invention as expressed in the following claims.

What is claimed is:

1. In an electric battery including a cell box which contains an electrolyte and an element formed from positive and negative electrodes with intervening separators, and cooling tubes for connection to a cooling device, the improvement wherein at least portions of one of the electrodes is provided with a frame which is formed as a tube made of a heat-conducting material, for connection to said cooling device.

2. The electric battery of claim 1 wherein the electrolyte is a fixed electrolyte.

3. The electric battery of claim 2 wherein the fixed electrolyte is a sulfuric acid electrolyte fixed in a gel formation.

4. The electric battery of claim 1 wherein said frame is formed around lower and side edges of said one of the electrodes.

5. The electric battery of claim 4 wherein at least one of the negative electrodes are formed as a mesh grid stretched over a U-shaped tube which extends around the mesh grid along its lower and side edges.

6. The electric battery of claim 5 wherein the mesh grid and U-shaped tube are formed of copper.

7. The electric battery of claim 6 wherein the copper mesh grid and the copper U-shaped tube are lead coated.

8. The electric battery of claim 5 wherein the mesh grid is an expanded metal grid, and wherein a residual strip of unexpanded grid material forms upper portions of the mesh grid, extending between portions of the U-shaped tube.

9. The electric battery of claim 8 wherein a lug is formed from the residual strip.

10. An electrode for an electric battery, said electric battery including a cell box which contains an electrolyte and an element formed from positive and negative electrodes with intervening separators, and cooling tubes for connection to a cooling device, and said electrode having a frame provided along peripheral portions thereof and formed as a tube made of a heat-conducting material, for connection to said cooling device.

11. The electrode of claim 10 wherein said frame is formed around lower and side edges of the electrode.

12. The electrode of claim 11 wherein at least one of the negative electrodes are formed as a mesh grid stretched over a U-shaped tube which extends around the mesh grid along its lower and side edges.

13. The electrode of claim 12 wherein the mesh grid and U-shaped tube are formed of copper.

14. The electrode of claim 13 wherein the copper mesh grid and the copper U-shaped tube are lead coated.

15. The electrode of claim 12 wherein the mesh grid is an expanded metal grid, and wherein a residual strip of unexpanded grid material forms upper portions of the mesh grid, extending between portions of the U-shaped tube.

16. The electrode of claim 15 wherein a lug is formed from the residual strip.

* * * * *